US012719843B2

(12) United States Patent
Pismenny et al.

(10) Patent No.: US 12,719,843 B2
(45) Date of Patent: Aug. 25, 2026

(54) AGGREGATING SECURED PACKETS IN A NETWORK DEVICE

(71) Applicant: Mellanox Technologies, Ltd., Yokneam (IL)

(72) Inventors: Boris Pismenny, Chavannes pres Renens (CH); Miriam Menes, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 174 days.

(21) Appl. No.: 18/741,851

(22) Filed: Jun. 13, 2024

(65) Prior Publication Data

US 2025/0193163 A1 Jun. 12, 2025

(30) Foreign Application Priority Data

Dec. 6, 2023 (IL) ........................................ 309163

(51) Int. Cl.
*H04L 9/40* (2022.01)
*H04L 69/22* (2022.01)

(52) U.S. Cl.
CPC .......... *H04L 63/0485* (2013.01); *H04L 69/22* (2013.01); *H04L 2212/00* (2013.01)

(58) Field of Classification Search
CPC ............. H04L 63/0485; H04L 63/0428; H04L 63/164; H04L 69/22; H04L 2212/00
See application file for complete search history.

(56) References Cited

U.S. PATENT DOCUMENTS

| | | | |
|---|---|---|---|
| 6,901,496 | B1 | 5/2005 | Mukund et al. |
| 7,657,659 | B1 | 2/2010 | Lambeth et al. |
| 8,006,297 | B2 | 8/2011 | Johnson et al. |
| 8,103,785 | B2 | 1/2012 | Crowley et al. |

(Continued)

FOREIGN PATENT DOCUMENTS

| | | | |
|---|---|---|---|
| EP | 1657878 | A1 | 5/2006 |
| EP | 2463782 | A2 | 6/2012 |
| WO | 2010062679 | A2 | 6/2010 |

OTHER PUBLICATIONS

Shirey., "Internet Security Glossary, Version 2", Request for Comments 4949, pp. 1-365, Aug. 2007.

(Continued)

*Primary Examiner* — Richard G Keehn
(74) *Attorney, Agent, or Firm* — Meitar Patents LTD.; Daniel Kligler

(57) ABSTRACT

In one embodiment, a network device includes a network interface to receive secured packets from a remote device over a packet data network, each of the secured packets being secured according to a security protocol and including a respective security protocol header and a Transmission Control Protocol (TCP) packet, which is encrypted according to the security protocol, a host device interface to connect the network device to a host device, and packet processing circuitry to decrypt each of the secured packets based on the respective security protocol header yielding multiple decrypted packets including decrypted TCP packets, aggregate the decrypted TCP packets into a single aggregated packet, and provide the single aggregated packet to software running on a processor of the host device via the host device interface.

18 Claims, 4 Drawing Sheets

(56) References Cited

U.S. PATENT DOCUMENTS 8,824,492 B2 9/2014 Wang et al.
8,879,435 B1 11/2014 Andersson
9,002,002 B1 4/2015 Poo et al.
9,038,073 B2 5/2015 Kohlenz et al.
9,678,818 B2 6/2017 Raikin et al.
9,904,568 B2 2/2018 Vincent et al.
10,078,613 B1 9/2018 Ramey
10,120,832 B2 11/2018 Raindel et al.
10,135,739 B2 11/2018 Raindel et al.
10,152,441 B2 12/2018 Liss et al.
10,210,125 B2 2/2019 Burstein
10,218,645 B2 2/2019 Raindel et al.
10,382,350 B2 8/2019 Bohrer et al.
10,423,774 B1 9/2019 Zelenov et al.
10,715,451 B2 7/2020 Raindel et al.
10,824,469 B2 11/2020 Hirshberg et al.
10,841,243 B2 11/2020 Levi et al.
10,956,346 B1 3/2021 Ben-Yehuda et al.
11,418,454 B2 8/2022 Pismenny et al.
11,502,948 B2 11/2022 Pismenny et al.
11,558,175 B2 1/2023 Menes et al.
11,683,266 B2 6/2023 Pismenny et al.
11,765,079 B2 9/2023 Pismenny et al.
2003/0018908 A1* 1/2003 Mercer .............. H04L 63/0485 713/193
2003/0023846 A1* 1/2003 Krishna .............. H04L 63/0485 713/162
2003/0226018 A1 12/2003 Tardo et al.
2004/0039940 A1 2/2004 Cox et al.
2004/0057434 A1 3/2004 Poon et al.
2004/0062267 A1* 4/2004 Minami ................ H04L 69/166 370/463
2004/0143734 A1* 7/2004 Buer .................. H04L 63/0485 713/153
2004/0158710 A1* 8/2004 Buer ..................... H04L 63/164 713/160
2005/0102497 A1 5/2005 Buer
2005/0198412 A1 9/2005 Pedersen et al.
2005/0207569 A1* 9/2005 Zhang ................ H04L 63/0428 380/28
2006/0095754 A1 5/2006 Hyder et al.
2006/0104308 A1 5/2006 Pinkerton et al.
2007/0101130 A1 5/2007 Tardo
2008/0147822 A1 6/2008 Benhase et al.
2008/0260158 A1 10/2008 Chin et al.
2008/0313364 A1 12/2008 Flynn et al.
2009/0080647 A1 3/2009 Mantin et al.
2009/0086736 A1 4/2009 Foong et al.
2009/0106771 A1 4/2009 Benner et al.
2009/0319775 A1 12/2009 Buer et al.
2009/0328170 A1 12/2009 Williams et al.
2010/0228962 A1 9/2010 Simon et al.
2011/0119673 A1 5/2011 Bloch et al.
2011/0246597 A1 10/2011 Swanson et al.
2012/0314709 A1 12/2012 Post et al.
2013/0080651 A1 3/2013 Pope et al.
2013/0125125 A1 5/2013 Karino et al.
2013/0142205 A1 6/2013 Munoz
2013/0263247 A1 10/2013 Jungck et al.
2013/0276133 A1 10/2013 Hodges et al.
2013/0329557 A1 12/2013 Petry
2013/0347110 A1 12/2013 Dalal
2014/0129741 A1 5/2014 Shahar et al.
2014/0185616 A1 7/2014 Bloch et al.
2014/0254593 A1 9/2014 Mital et al.
2014/0282050 A1 9/2014 Quinn et al.
2014/0282561 A1 9/2014 Holt et al.
2014/0355754 A1 12/2014 Leung et al.
2015/0100962 A1 4/2015 Morita et al.
2015/0131447 A1 5/2015 Petry et al.
2015/0288624 A1 10/2015 Raindel et al.
2015/0347185 A1 12/2015 Holt et al.
2015/0355938 A1 12/2015 Jokinen et al.
2016/0065659 A1 3/2016 Bloch et al.
2016/0132329 A1 5/2016 Gupte et al.
2016/0226822 A1 8/2016 Zhang et al.
2016/0306668 A1 10/2016 Heil et al.
2016/0342547 A1 11/2016 Liss et al.
2016/0350151 A1 12/2016 Zou et al.
2016/0378529 A1 12/2016 Wen
2017/0075855 A1 3/2017 Sajeepa et al.
2017/0180273 A1 6/2017 Daly et al.
2017/0237672 A1 8/2017 Dalal
2017/0264622 A1 9/2017 Cooper et al.
2017/0286157 A1 10/2017 Hasting et al.
2017/0371835 A1 12/2017 Ranadive et al.
2018/0004954 A1 1/2018 Liguori et al.
2018/0067893 A1 3/2018 Raindel et al.
2018/0109471 A1 4/2018 Chang et al.
2018/0114013 A1 4/2018 Sood et al.
2018/0167364 A1 6/2018 Dong et al.
2018/0210751 A1 7/2018 Pepus et al.
2018/0219770 A1 8/2018 Wu et al.
2018/0219772 A1 8/2018 Koster et al.
2018/0246768 A1 8/2018 Palermo et al.
2018/0262468 A1 9/2018 Kumar et al.
2018/0285288 A1 10/2018 Bernat et al.
2018/0329828 A1 11/2018 Apfelbaum et al.
2019/0012350 A1 1/2019 Sindhu et al.
2019/0026157 A1 1/2019 Suzuki et al.
2019/0044705 A1 2/2019 Deval et al.
2019/0102568 A1 4/2019 Hausauer et al.
2019/0116127 A1 4/2019 Pismenny et al.
2019/0123891 A1 4/2019 Pismenny et al.
2019/0124054 A1* 4/2019 Zhang ................. H04L 63/0428
2019/0132118 A1 5/2019 Ghosh et al.
2019/0163364 A1 5/2019 Gibb et al.
2019/0173846 A1 6/2019 Patterson et al.
2019/0190892 A1 6/2019 Menachem et al.
2019/0199835 A1 6/2019 Deval et al.
2019/0250938 A1 8/2019 Claes et al.
2020/0012604 A1 1/2020 Agarwal
2020/0026656 A1 1/2020 Liao et al.
2020/0169383 A1 5/2020 Durham et al.
2020/0236140 A1* 7/2020 Srinivasan ............ H04L 5/0055
2020/0259803 A1 8/2020 Menachem et al.
2020/0266955 A1* 8/2020 Agrawal ................ H04L 69/16
2020/0314181 A1 10/2020 Eran et al.
2020/0401440 A1 12/2020 Sankaran et al.
2021/0385203 A1* 12/2021 Wang ................. H04L 63/0428
2022/0394081 A1 12/2022 Efraim et al.
2023/0097439 A1 3/2023 Menes et al.
2023/0107406 A1 4/2023 Menes et al.

OTHER PUBLICATIONS

Information Sciences Institute, "Transmission Control Protocol; DARPA Internet Program Protocol Specification", Request for Comments 793, pp. 1-90, Sep. 1981.
InfiniBand TM Architecture Specification vol. 1, Release 1.3, pp. 1-1842, Mar. 3, 2015.
Stevens., "TCP Slow Start, Congestion Avoidance, Fast Retransmit, and Fast Recovery Algorithms", Request for Comments 2001, pp. 1-6, Jan. 1997.
Netronome Systems, Inc., "Open vSwitch Offload and Acceleration with Agilio® CX SmartNICs", White Paper, pp. 1-7, Mar. 2017.
PCI Express® Base Specification ,Revision 3.0, pp. 1-860, Nov. 10, 2010.
Dierks et al., "The Transport Layer Security (TLS) Protocol Version 1.2", Request for Comments: 5246 , pp. 1-104, Aug. 2008.
Turner et al., "Prohibiting Secure Sockets Layer (SSL) Version 2.0", Request for Comments: 6176, pp. 1-4, Mar. 2011.
Rescorla et al., "The Transport Layer Security (TLS) Protocol Version 1.3", Request for Comments: 8446, pp. 1-160, Aug. 2018.
Comer., "Packet Classification: A Faster, More General Alternative to Demultiplexing", The Internet Protocol Journal, vol. 15, No. 4, pp. 12-22, Dec. 2012.
Salowey et al., "AES Galois Counter Mode (GCM) Cipher Suites for TLS", Request for Comments: 5288, pp. 1-8, Aug. 2008.
Burstein, "Enabling Remote Persistent Memory", SNIA—PM Summit, pp. 1-24, Jan. 24, 2019.

(56) References Cited

OTHER PUBLICATIONS

Chung et al., "Serving DNNs in Real Time at Datacenter Scale with Project Brainwave", IEEE Micro Pre-Print, pp. 1-11, Mar. 22, 2018.
Talpey, "Remote Persistent Memory—With Nothing But Net", SNIA—Storage developer conference , pp. 1-30, year 2017.
Microsoft, "Project Brainwave", pp. 1-5, year 2019.
NVM Express Inc., "NVM ExpressTM Base Specification", Revision 1.4, p. 1-403, Jun. 10, 2019.
Pismenny et al., "Autonomous NIC Offloads", submitted for evaluation of the 26th International Conference on Architectural Support for Programming Languages and Operating Systems (ASPLOS '21), p. 1-18, Dec. 13, 2020.
Lebeane et al., "Extended Task queuing: Active Messages for Heterogeneous Systems", Proceedings of the International Conference for High Performance Computing, Networking, Storage and Analysis (SC'16), pp. 933-944, Nov. 2016.
Wikipedia, "Random Early Detection," pp. 1-4, Jul. 2022.
Study CCNP, "Qos Marketing Mechanism Explained," study-ccnp.com, p. 1-3, year 2022.
Jayasumana et al., "Improved Packet Reordering Metrics," RFC 5236, Network Working Group, pp. 1-26, Jun. 2008.
Hewlett-Packard Development Company, L.P., "QoS Queue Configuration," pp. 1-4, year 2015.
Rescorla et al., "The Datagram Transport Layer Security (DTLS) Protocol Vesion 1.3," RFC 9147, Internet Engineering Task Force (IETF), pp. 1-64, Apr. 2022.
Pismenny, U.S. Appl. No. 18/483,547, filed Oct. 10, 2023.
Eddy (Ed.), "Transmission Control Protocol (TCP)," RFC 9293, Internet Engineering Task Force (IETF), pp. 1-98, Aug. 2022.
Wikipedia, "User Datagram Protocol," pp. 1-4, last edited Aug. 6, 2024 There is a multitude of earlier versions in archive but impossible to download (priority dates are Jan. 6, 2023 and Sep. 26, 2023 https://en.wikipedia.org/wiki/User_Datagram_Protocol.
EP Application # 24179236.5 Search Report dated Jul. 31, 2024.
Rescorla et al., "Datagram Transport Layer Security Version 1.2," RFC 6347, Internet Engineering(IETF), pp. 1-32, Jan. 2012.
Shalom et al., U.S. Appl. No. 18/143,411, filed May 4, 2023.
Wikipedia, "Internet Protocol Security (IPsec)," pp. 1-8, last edited May 11, 2023.
Github, "PSP Architecture Specification," Google, pp. 1-25, Nov. 17, 2022.
IEEE Std. 802.1AE™—2018, "IEEE Standard for Local and Metropolitan Area Networks—Media Access Control (MAC) Security," IEEE Computer Society, pp. 1-239, Sep. 27, 2018.
Menes et al., U.S. Appl. No. 18/528,603, filed Dec. 4, 2023.
Pismenny et al., U.S. Appl. No. 18/595,475, filed Mar. 5, 2024.
Basher et al., U.S. Appl. No. 18/626,354, filed Apr. 4, 2024.

* cited by examiner

Fig. 1

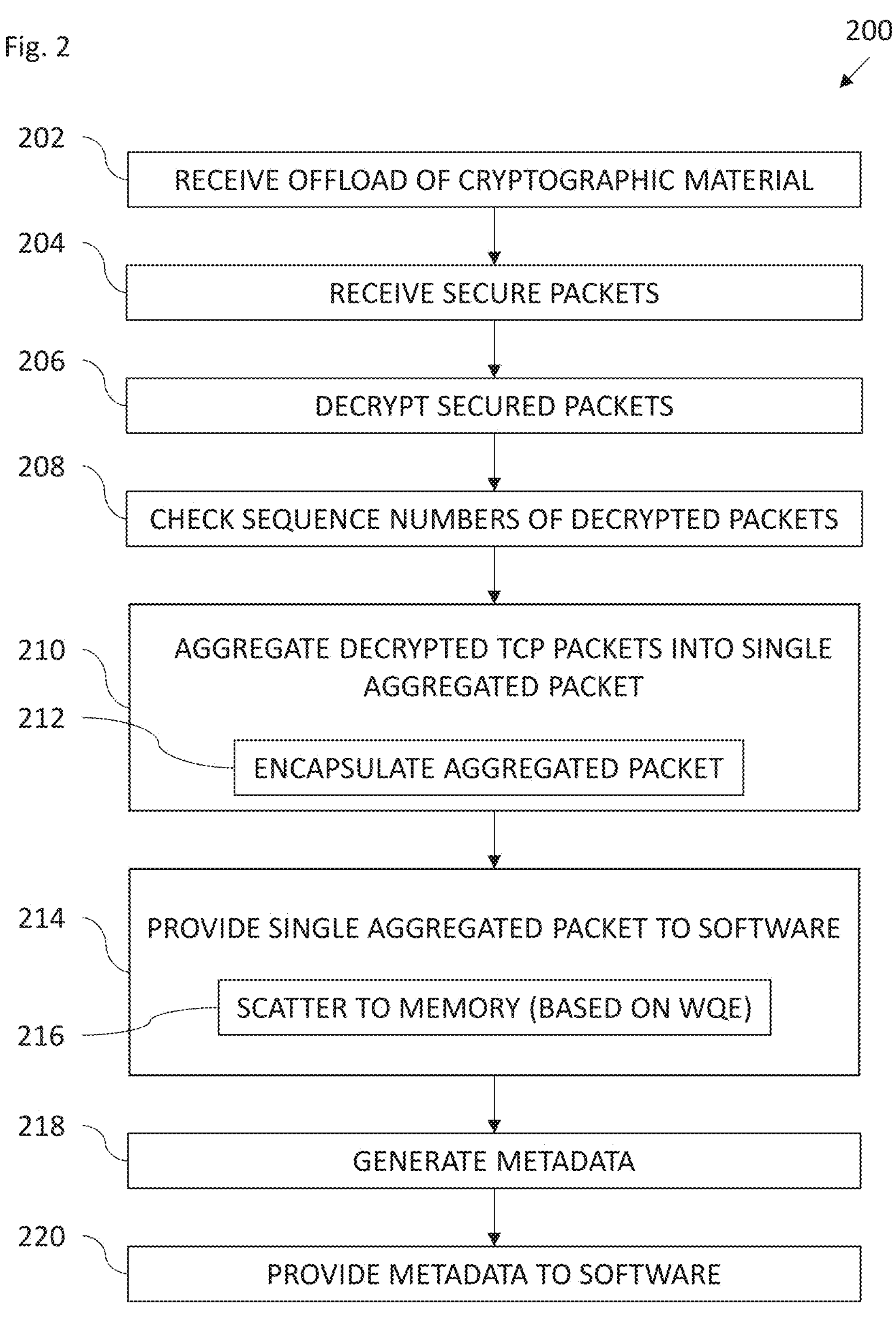
Fig. 2
200
202
RECEIVE OFFLOAD OF CRYPTOGRAPHIC MATERIAL
204
RECEIVE SECURE PACKETS
206
DECRYPT SECURED PACKETS
208
CHECK SEQUENCE NUMBERS OF DECRYPTED PACKETS
210
AGGREGATE DECRYPTED TCP PACKETS INTO SINGLE AGGREGATED PACKET
212
ENCAPSULATE AGGREGATED PACKET
214
PROVIDE SINGLE AGGREGATED PACKET TO SOFTWARE
216
SCATTER TO MEMORY (BASED ON WQE)
218
GENERATE METADATA
220
PROVIDE METADATA TO SOFTWARE 300
32
SECURED PACKET
SECURED PACKET
SECURED PACKET
SECURED PACKET
40
38
SECURITY PROTOCOL HEADER
TCP PACKET
206
DECRYPTION
44
42
210
AGGREGATE
TCP HEADER
TCP PAYLOAD
46
48
58
36
AGGREGATED PACKET
METADATA
50
52
54
SECURITY PROTOCOL HEADER
TCP HEADER
PAYLOAD
WQE
SCATTER
TCP PAYLOAD
56
216
20
MEMORY 400
402
OFFLOAD CRYPTOGRAPHIC MATERIAL TO NETWORK DEVICE
404
RECEIVE METADATA
406
RECEIVE PACKET
408
DECAPSULATE PACKET
410
DERIVE SEQUENCE NUMBERS FROM METADATA OR FROM HEADER DATA AND NUMBER OF DECRYPTED PACKETS INCLUDED IN THE AGGREGATED PACKET.
412
PERFORM REPLAY PROTECTION CHECK INCLUDING UPDATING REPLAY PROTECTION MAP

AGGREGATING SECURED PACKETS IN A NETWORK DEVICE

FIELD OF THE INVENTION

The present invention relates to computer systems, and in particular, but not exclusively to, aggregation of secured packets.

BACKGROUND

Large Receive Offload (LRO) or packet aggregation is a performance optimization technique that reduces central processing unit (CPU) overhead for processing packets that arrive from the network at a high rate. With LRO, hardware, e.g., in a network device, aggregates received packets into aggregated packets, and the networking code in the kernel fetches the aggregated packets, and processes the aggregated packets as respective units. LRO reassembles incoming network packets into larger buffers and transfers the resulting larger but fewer packets to the network stack of the host or virtual machine. By doing so, LRO reduces the number of packets that the CPU has to process, which in turn reduces its utilization for networking. This is especially useful for connections that have high bandwidth.

SUMMARY

There is provided in accordance with an embodiment of the present disclosure, a network device, including a network interface to receive secured packets from a remote device over a packet data network, each of the secured packets being secured a security protocol and including a respective security protocol header and a Transmission Control Protocol (TCP) packet, which is encrypted the security protocol, a host device interface to connect the network device to a host device, and packet processing circuitry to decrypt each of the secured packets based on the respective security protocol header yielding multiple decrypted packets including decrypted TCP packets, aggregate the decrypted TCP packets into a single aggregated packet, and provide the single aggregated packet to software running on a processor of the host device via the host device interface.

Further in accordance with an embodiment of the present disclosure the aggregated packet is encapsulated with a given security protocol header and a given TCP header.

Still further in accordance with an embodiment of the present disclosure the packet processing circuitry is to scatter the single aggregated packet to a memory of the host device accessible by the software.

Additionally in accordance with an embodiment of the present disclosure the packet processing circuitry is to scatter the single aggregated packet to the memory a memory location given by a work queue entry consumed by the single aggregated packet.

Moreover, in accordance with an embodiment of the present disclosure the security protocol is a per packet encryption protocol.

Further in accordance with an embodiment of the present disclosure the security protocol is any one of the following Internet Protocol Security (IPsec), PSP Security Protocol, Datagram Transport Layer Security (DTLS), or Media Access Control Security (MACSec).

Still further in accordance with an embodiment of the present disclosure packet processing circuitry is to check that sequence numbers of the multiple decrypted packets form a sequence of consecutive numbers, and aggregate the decrypted TCP packets into the single aggregated packet responsively to the sequence numbers of the multiple decrypted packets forming a sequence of consecutive numbers.

Additionally in accordance with an embodiment of the present disclosure the packet processing circuitry is to check that the sequence numbers in security protocol headers and TCP headers of the decrypted packets form respective sequences of consecutive numbers, and aggregate the decrypted TCP packets into the single aggregated packet responsively to the sequence numbers in the security protocol headers and the TCP headers of the multiple decrypted packets forming respective sequences of consecutive numbers.

Moreover, in accordance with an embodiment of the present disclosure the packet processing circuitry is to generate metadata about the number of decrypted TCP packets included in the single aggregated packet, and provide the metadata to the software running on the processor of the host device.

Further in accordance with an embodiment of the present disclosure the packet processing circuitry is to generate the metadata with an indication of the sequence numbers of the decrypted packets included in the single aggregated packet.

Still further in accordance with an embodiment of the present disclosure the packet processing circuitry is to receive an offload of cryptographic material from the software running on the processor of the host device, and decrypt the TCP packet of each of the secured packets based on the respective security protocol header and the offloaded cryptographic material yielding the decrypted TCP packets.

There is also provided in accordance with another embodiment of the present disclosure, a system including the network device of, and the host device, wherein the software is to receive the single aggregated packet, and decapsulate the given security protocol header from the aggregated packet.

Additionally in accordance with an embodiment of the present disclosure the software is to update a replay protection map based on security protocol sequence numbers of the decrypted packets included in the single aggregated packet.

Moreover, in accordance with an embodiment of the present disclosure the software is to derive the security protocol sequence numbers from metadata of the single aggregated packet, or header data of the single aggregated packet and a number of decrypted packets included in the single aggregated packet.

There is also provided in accordance with still another embodiment of the present disclosure, a method, including receiving secured packets from a remote device over a packet data network, each of the secured packets being secured a security protocol and including a respective security protocol header and a Transmission Control Protocol (TCP) packet, which is encrypted the security protocol, decrypting each of the secured packets based on the respective security protocol header yielding multiple decrypted packets including decrypted TCP packets, aggregating the decrypted TCP packets into a single aggregated packet, and providing the single aggregated packet to software running on a processor of a host device via a host device interface.

Further in accordance with an embodiment of the present disclosure the aggregated packet is encapsulated with a given security protocol header and a given TCP header.

Still further, in accordance with an embodiment of the present disclosure, the method includes scattering the single aggregated packet to a memory of the host device accessible by the software.

Additionally in accordance with an embodiment of the present disclosure the scattering includes scattering the single aggregated packet to the memory a memory location given by a work queue entry consumed by the single aggregated packet.

Moreover, in accordance with an embodiment of the present disclosure the security protocol is a per packet encryption protocol.

Further in accordance with an embodiment of the present disclosure the security protocol is any one of the following Internet Protocol Security (IPsec), PSP Security Protocol, Datagram Transport Layer Security (DTLS), or Media Access Control Security (MACSec).

Still further in accordance with an embodiment of the present disclosure, the method includes checking that sequence numbers of the multiple decrypted packets form a sequence of consecutive numbers, and wherein the aggregating includes aggregating the decrypted TCP packets into the single aggregated packet responsively to the sequence numbers of the multiple decrypted packets forming a sequence of consecutive numbers.

Additionally in accordance with an embodiment of the present disclosure the checking includes checking that the sequence numbers in security protocol headers and TCP headers of the decrypted packets form respective sequences of consecutive numbers, and the aggregating includes aggregating the decrypted TCP packets into the single aggregated packet responsively to the sequence numbers in the security protocol headers and the TCP headers of the multiple decrypted packets forming respective sequences of consecutive numbers.

Moreover, in accordance with an embodiment of the present disclosure, the method includes generating metadata about the number of decrypted TCP packets included in the single aggregated packet, and providing the metadata to the software running on the processor of the host device.

Further in accordance with an embodiment of the present disclosure the generating includes generating the metadata with an indication of the sequence numbers of the decrypted packets included in the single aggregated packet.

Still further in accordance with an embodiment of the present disclosure, the method includes receiving an offload of cryptographic material from the software running on the processor of the host device, wherein the decrypting includes decrypting the TCP packet of each of the secured packets based on the respective security protocol header and the offloaded cryptographic material yielding the decrypted TCP packets.

Additionally in accordance with an embodiment of the present disclosure, the method includes receiving the single aggregated packet, and decapsulating the given security protocol header from the aggregated packet.

Moreover, in accordance with an embodiment of the present disclosure, the method includes updating a replay protection map based on security protocol sequence numbers of the decrypted packets included in the single aggregated packet.

Further in accordance with an embodiment of the present disclosure the software is to derive the security protocol sequence numbers from metadata of the single aggregated packet, or header data of the single aggregated packet and a number of decrypted packets included in the single aggregated packet.

BRIEF DESCRIPTION OF THE DRAWINGS

The present invention will be understood from the following detailed description, taken in conjunction with the drawings in which:

FIG. 1 is a block diagram view of a computer system constructed and operative in accordance with an embodiment of the present invention;

FIG. 2 is a flowchart including steps in a method of operation of a network device in the system of FIG. 1;

DESCRIPTION OF EXAMPLE EMBODIMENTS

Overview

Figure 3:
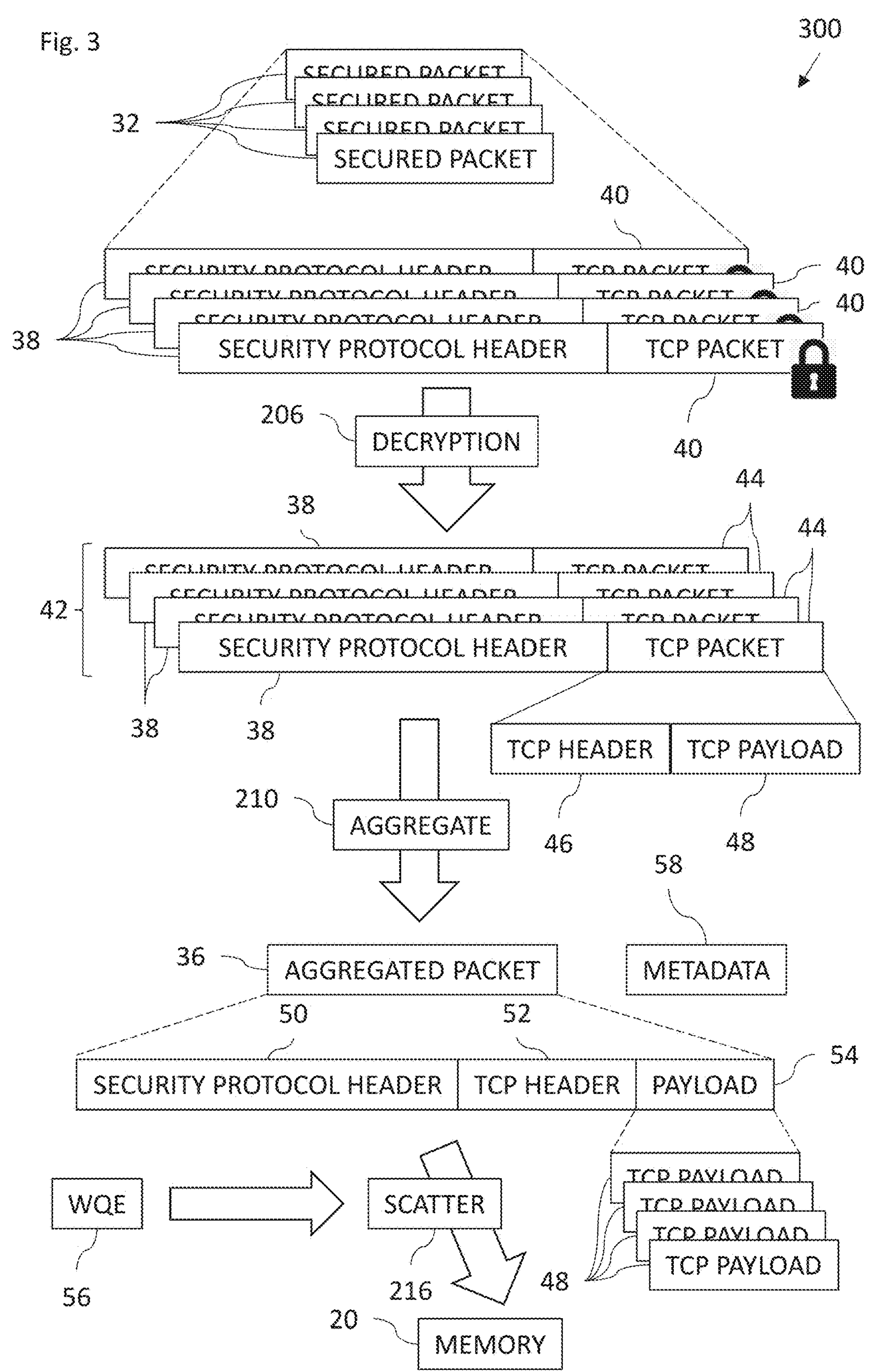
FIG. 3 is a flow diagram illustrating packet aggregation in a network device in the system of FIG. 1.

As previously mentioned, packet aggregation reduces the number of packets that a CPU has to process, which in turn reduces its utilization for networking. Currently, packet aggregation is not performed for secured, e.g., encrypted packets, for two reasons: (1) an inner flow of the packets (e.g., TCP packet sequence numbers) is hidden by the encryption; and (2) network device hardware lacks support for stateful operations performed per flow, such as replay protection updates.

Therefore, embodiments of the present invention, address at least some of the abovementioned drawbacks, by providing a network device, which receives an offload of cryptographic information (e.g., from a connected host device), receives secured packets encrypted using a per packet encryption protocol (e.g., Internet Protocol Security (IPsec), PSP Security Protocol, Datagram Transport Layer Security (DTLS), or Media Access Control Security (MACSec)), decrypts the received secured packets (without removing the security protocol header, e.g., if the packet is an IPSEC packet, the packet remains an IPSEC packet after decryption) based on the offloaded cryptographic information and/or data derived from the packet headers yielding multiple decrypted packets, and aggregates data from the multiple decrypted packets into an aggregated packet.

The network device may then present the aggregated packet to software running on the host device for further processing. For example, the network device may scatter the aggregated packet to memory (e.g., of the host device) for retrieval by the software running on the host device. In some embodiments, the network device may scatter the aggregated packet to a memory location indicated by a work queue entry (WQE) consumed by the aggregated packet.

The secured packets may include a security protocol header, a TCP header, and a TCP payload. The aggregated packet may include multiple TCP payloads inserted into the payload of the aggregated packet. The network device may encapsulate the payload of the aggregated packet with a TCP header, and a security protocol header, based on the TCP headers and security protocol headers of the decrypted packets aggregated into the aggregation packet. The TCP header and the security protocol header of the aggregation packet may include an indication of, or a list of, the security protocol packet sequence numbers and the TCP sequence numbers, respectively, of the packets aggregated into the aggregated packet.

In some embodiments, for example, where replay attack protection is performed by software running on the host device, the network device inspects the packet headers of the decrypted packets and only aggregates decrypted packets where the decrypted packets have sequential packet sequence numbers, e.g., security protocol sequence numbers, and/or TCP sequence numbers.

In some embodiments, the network device generates metadata about the aggregated packet. The metadata may indicate the packet sequence numbers of the packets aggregated into the aggregated packet and/or the number of packets aggregated into the aggregated packet. The metadata may also indicate the memory location(s) to which the aggregated packet has been (or will be) scattered in memory. The metadata may be included in a completion queue entry (CQE) written by the network device to a completion queue, e.g., in the memory, for reading by the software running on the host.

The software running on the host receives the aggregated packet (e.g., based on the metadata), decapsulates the packet of the security protocol header and the TCP header, and may perform any stateful operations in the encryption protocol layer, such as updating the replay protection map e.g., in IPSEC.

System Description

Figure 1:
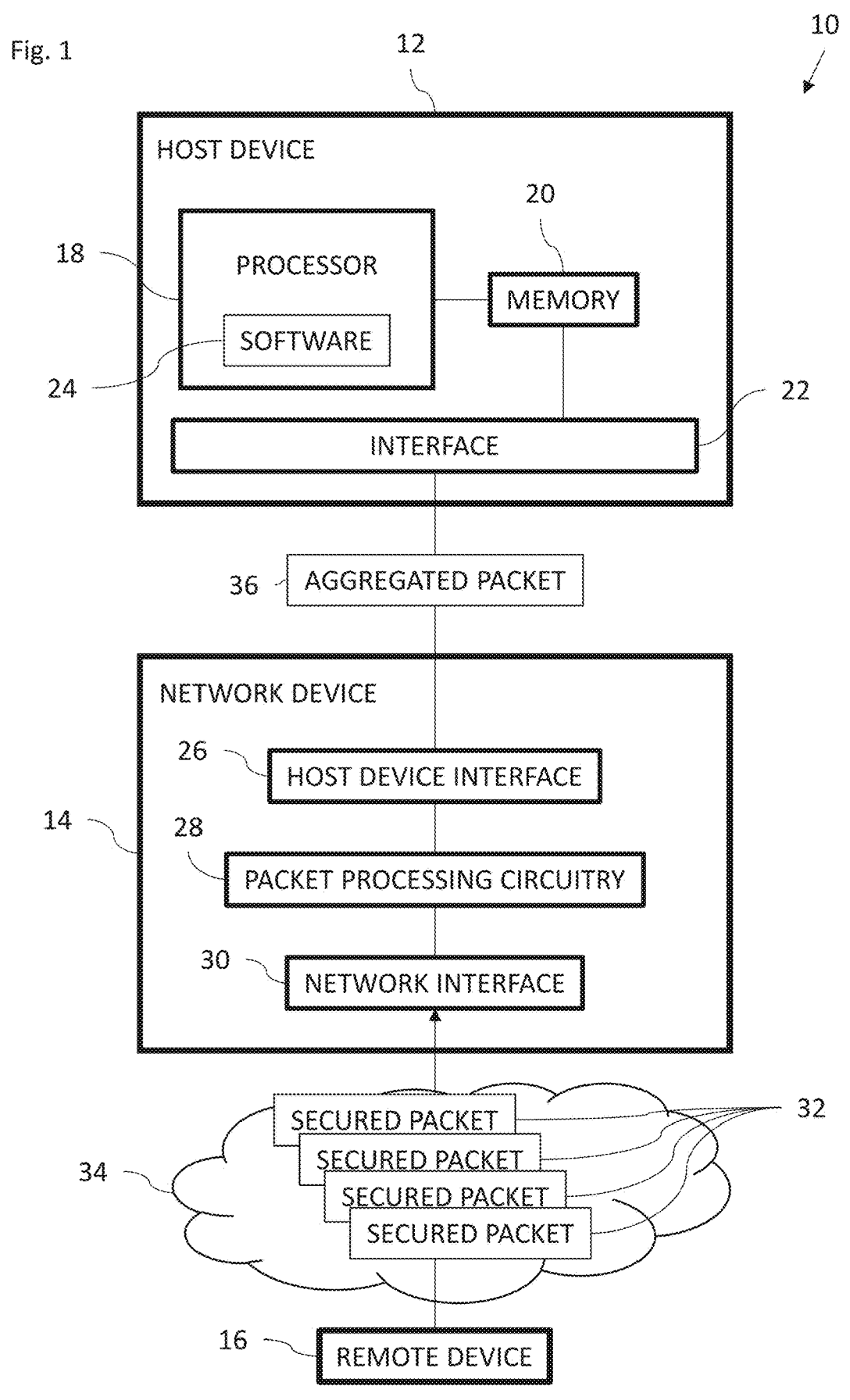

Reference is now made to FIG. 1, which is a block diagram view of a computer system 10 constructed and operative in accordance with an embodiment of the present invention. The computer system 10 includes a host device 12, a network device 14, and a remote device 16.

The host device 12 includes a processor 18, a memory 20, and an interface 22. The processor 18 is configured to execute software 24 described in more detail with reference to FIG. 4. The memory 20 is configured to store: data used by the processor 18; received packets for processing by the software 24; and queues such as a work queue including WQEs and a completion queue including CQEs. The interface 22 is configured to connect the host device 12 with the network device 14 for data sharing purposes. The interface 22 may operate according to any suitable protocol, for example, according to a data communication bus protocol, such as, Peripheral Component Interconnect Express (PCIe).

The network device 14 includes a host device interface 26, packet processing circuitry 28, and a network interface 30. The host device interface 26 is configured to connect the network device 14 to host device 12 for data sharing purposes, for example, according to a data communication bus protocol, such as, Peripheral Component Interconnect Express (PCIe). The network interface 30 is configured to receive secured packets 32 from the remote device 16 over a packet data network 34. The packet processing circuitry 28 is configured to decrypt the secured packets 32, and aggregate the decrypted packets into an aggregated packet 36, as described in more detail with reference to FIGS. 2 and 3. The packet processing circuitry 28 is configured to provide the aggregated packet 36 to the software 24 running on the processor 18 of the host device 12, for example, by scattering the aggregated packet 36 to memory, e.g., the memory 20, for retrieval by the software 24, as described in more detail with reference to FIG. 4.

Reference is now made to FIGS. 2 and 3. FIG. 2 is a flowchart 200 including steps in a method of operation of the network device 14 in the system 10 of FIG. 1. FIG. 3 is a flow diagram 300 illustrating packet aggregation in the network device 14 in the system 10 of FIG. 1. The packet processing circuitry 28 is configured to receive an offload of cryptographic material from the software 24 running on the processor 18 of the host device 12 (block 202).

The network interface 30 is configured to receive secured packets 32 from the remote device 16 over packet data network 34 (block 204). Each of the secured packets 32 is secured according to a security protocol and includes a respective security protocol header 38 and a secured (e.g., encrypted) Transmission Control Protocol (TCP) packet 40, which is encrypted according to the security protocol. The security protocol is generally a per packet encryption protocol. The security protocol may be any one of the following: Internet Protocol Security (IPsec); PSP Security Protocol; Datagram Transport Layer Security (DTLS); or Media Access Control Security (MACSec).

The packet processing circuitry 28 is configured to decrypt each of the secured packets 32 based on the respective security protocol header 38 yielding multiple decrypted packets 42 including decrypted TCP packets 44 (block 206). The decrypted packets 42 are still security protocol packets and include the respective security protocol headers 38. Each of the decrypted TCP packets 44 includes a TCP header 46 and a TCP payload 48. In some embodiments, the packet processing circuitry 28 is configured to decrypt the TCP packet 40 of each of the secured packets 32 based on the respective security protocol header 38 and the offloaded cryptographic material yielding the decrypted TCP packets 44.

The packet processing circuitry 28 is configured to check that packet sequence numbers (e.g., of the security protocol header 38 and/or the TCP header 46) of the multiple decrypted packets 42 form a sequence of consecutive numbers (block 208). In some embodiments, the packet processing circuitry 28 is configured to check that the sequence numbers in security protocol headers 38 and TCP headers 46 of the decrypted packets 42 form respective sequences of consecutive numbers (e.g., one consecutive sequence for the security protocol header 38 packet sequence numbers, and another consecutive sequence for the TCP header 46 packet sequence numbers).

In other embodiments, cryptographic replay protection and TCP window validation may also be offloaded by the software 24 to the packet processing circuitry 28 to perform replay attack protection. In these other embodiments, the packet processing circuitry 28 would indicate in metadata that the replay attack protection has been performed for the relevant packets. The software 24 may then determine whether to perform additional validation. In some cases, such as errors, software 24 may perform further checks and/or logging.

The packet processing circuitry 28 is configured to aggregate the decrypted TCP packets 42 into a single aggregated packet 36 (block 210). In some embodiments, the packet processing circuitry 28 is configured to aggregate the decrypted TCP packets 44 into the single aggregated packet 36 responsively to the sequence numbers (e.g., security protocol packet sequence numbers or TCP packet sequence numbers) of the multiple decrypted packets 42 forming a sequence of consecutive numbers. In some embodiments, the packet processing circuitry 28 is configured to aggregate the decrypted TCP packets 44 into the single aggregated packet 36 responsively to the sequence numbers in the security protocol headers 38 and the TCP headers 46 of the multiple decrypted packets 42 forming respective sequences of consecutive numbers.

The packet processing circuitry 28 is configured to encapsulate the aggregated packet 36 with a given security protocol header 50 and a given TCP header 52 based on the security protocol headers 38 and the TCP header 46 of the decrypted packets 42 (block 212). The aggregated packet 36 therefore includes the security protocol header 50, the TCP header 52, a payload 54 comprising the TCP payloads 48 of the decrypted packets 42. The security protocol header 50 may indicate the packet sequence numbers included in the security protocol headers 38 of the decrypted packets 42 aggregated into the aggregated packet 36. The security protocol header 50 may also include other information common to the security protocol headers 38 of the decrypted packets 42 aggregated into the aggregated packet 36. The TCP header 52 may indicate the packet sequence numbers included in the TCP headers 46 of the decrypted packets 42 aggregated into the aggregated packet 36. The TCP header 52 may also include other information common to the TCP headers 46 of the decrypted packets 42 aggregated into the aggregated packet 36 such as Source Port, Destination Port, Acknowledgement Number, Header Length, Window Size, Flags, TCP Checksum, and Urgent Pointer.

The packet processing circuitry 28 is configured to provide the single aggregated packet 36 to the software 24 running on the processor 18 of the host device 12 via the host device interface 26 (block 214). In some embodiments, the packet processing circuitry 28 is configured to scatter the single aggregated packet 36 to the memory 20 of the host device 12 accessible by the software 24 (block 216). In some embodiments, the packet processing circuitry 28 is configured to scatter the single aggregated packet 36 to the memory 20 according to a memory location given by a work queue entry (WQE) 56 consumed by the single aggregated packet 36. In other embodiments, the packet processing circuitry 28 may scatter the aggregated packet 36 to the memory 20 without using a WQE.

The packet processing circuitry 28 is configured to generate metadata 58 about the number of decrypted TCP packets 44 comprised in the single aggregated packet 36 (block 218), and provide the metadata 58 to the software 24 running on the processor 18 of the host device 12 (block 220). In some embodiments, the packet processing circuitry 28 is configured to generate the metadata 58 with an indication of the sequence numbers (e.g., security protocol packet sequence numbers and/or TCP packet sequence numbers) of the decrypted packets 42 comprised in the single aggregated packet 36. In some embodiments, the metadata 58 may be provided to the software 24 using a completion queue entry (CQE) indicating completion processing of the aggregated packet 36 by the packet processing circuitry 28. In some embodiments, the indication of the sequence numbers (e.g., the sequence number of the first decrypted packet 42 included in the aggregated packet 36) may be added to header data of the aggregated packet 36.

In practice, some or all of these functions of the packet processing circuitry 28 may be combined in a single physical component or, alternatively, implemented using multiple physical components. These physical components may comprise hard-wired or programmable devices, or a combination of the two. In some embodiments, at least some of the functions of the packet processing circuitry 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 4:
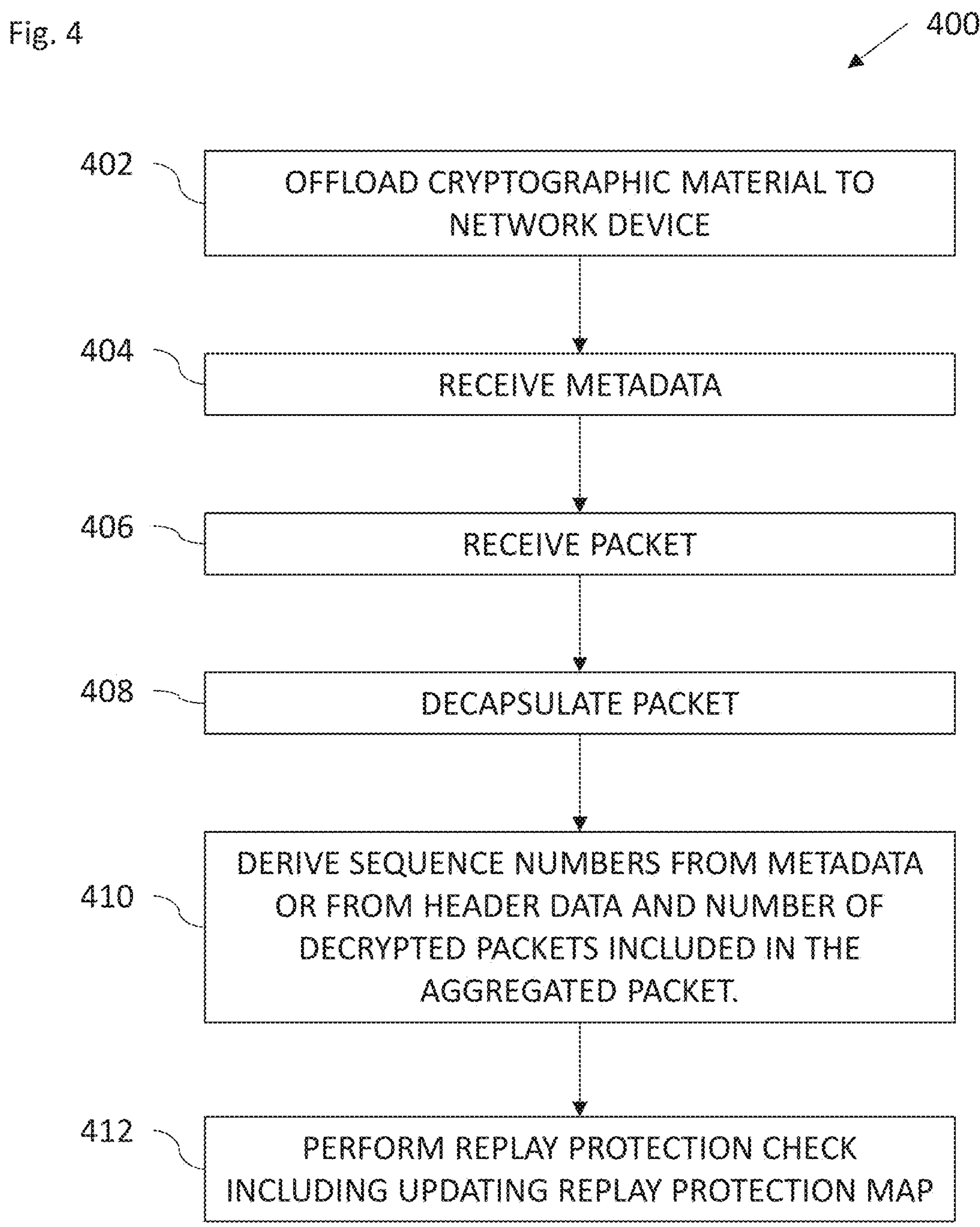
FIG. 4 is a flowchart including steps in a method of operation of a host device in the system of FIG. 1.

Reference is now made to FIG. 4, which is a flowchart 400 including steps in a method of operation of the host device 12 in the system 10 of FIG. 1. The software 24 running on the processor 18 of the host device 12 is configured to: offload cryptographic material to the network device 14 (block 402); receive the metadata 58 (e.g., in a CQE) (block 404); receive the single aggregated packet 36 (block 406) for example, based on location(s) included in the metadata 58; decapsulate the security protocol header 50 (and the TCP header 52) from the aggregated packet 36 (block 408); derive security protocol sequence numbers of decrypted packets 42 from: the metadata 58 of the aggregated packet 36; or from header data of the single aggregated packet 36 and a number of decrypted packets 42 included in the single aggregated packet 36 (block 410), and perform replay protection check(s) (e.g., based on the packet sequence number data included in the metadata 58, security protocol header 50 and/or the TCP header 52) and update a replay protection map based on security protocol sequence numbers (and/or the TCP packet sequence numbers) of the decrypted packets 42 included in the single aggregated packet 36 and/or the metadata 58 (block 412).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:

a network interface to receive secured packets from a remote device over a packet data network, each of the secured packets being secured according to a security protocol and including a respective security protocol header and a Transmission Control Protocol (TCP) packet, which is encrypted according to the security protocol;

a host device interface to connect the network device to a host device; and packet processing circuitry to:

decrypt each of the secured packets based on the respective security protocol header yielding multiple decrypted packets including decrypted TCP packets;

aggregate the decrypted TCP packets into a single aggregated packet; and provide the single aggregated packet to software running on a processor of the host device via the host device interface, wherein the packet processing circuitry is to scatter the single aggregated packet to a memory of the host device accessible by the software according to a memory location given by a work queue entry consumed by the single aggregated packet.

2. The device according to claim 1, wherein the aggregated packet is encapsulated with a given security protocol header and a given TCP header.

3. The device according to claim 1, wherein the security protocol is a per packet encryption protocol.

4. The device according to claim 3, wherein the security protocol is any one of the following: Internet Protocol Security (IPsec); PSP Security Protocol; Datagram Transport Layer Security (DTLS); or Media Access Control Security (MACSec).

5. The device according to claim 1, wherein packet processing circuitry is to:

check that sequence numbers of the multiple decrypted packets form a sequence of consecutive numbers; and aggregate the decrypted TCP packets into the single aggregated packet responsively to the sequence numbers of the multiple decrypted packets forming a sequence of consecutive numbers.

6. The device according to claim 5, wherein the packet processing circuitry is to:

check that the sequence numbers in security protocol headers and TCP headers of the decrypted packets form respective sequences of consecutive numbers; and aggregate the decrypted TCP packets into the single aggregated packet responsively to the sequence numbers in the security protocol headers and the TCP headers of the multiple decrypted packets forming respective sequences of consecutive numbers.

7. The device according to claim 5, wherein the packet processing circuitry is to:

generate metadata about the number of decrypted TCP packets comprised in the single aggregated packet; and provide the metadata to the software running on the processor of the host device.

8. The device according to claim 7, wherein the packet processing circuitry is to generate the metadata with an indication of the sequence numbers of the decrypted packets comprised in the single aggregated packet.

9. The device according to claim 1, wherein the packet processing circuitry is to:

receive an offload of cryptographic material from the software running on the processor of the host device; and decrypt the TCP packet of each of the secured packets based on the respective security protocol header and the offloaded cryptographic material yielding the decrypted TCP packets.

10. A system comprising:

the network device of claim 1; and the host device, wherein the software is to:

receive the single aggregated packet; and decapsulate the given security protocol header from the aggregated packet.

11. The system according to claim 10, wherein the software is to update a replay protection map based on security protocol sequence numbers of the decrypted packets included in the single aggregated packet.

12. The system according to claim 11, wherein the software is to derive the security protocol sequence numbers from: metadata of the single aggregated packet; or header data of the single aggregated packet and a number of decrypted packets included in the single aggregated packet.

13. A network device, comprising:

a network interface to receive secured packets from a remote device over a packet data network, each of the secured packets being secured according to a security protocol and including a respective security protocol header and a Transmission Control Protocol (TCP) packet, which is encrypted according to the security protocol;

a host device interface to connect the network device to a host device; and packet processing circuitry to:

decrypt each of the secured packets based on the respective security protocol header yielding multiple decrypted packets including decrypted TCP packets;

check that sequence numbers of the multiple decrypted packets form a sequence of consecutive numbers;

aggregate the decrypted TCP packets into a single aggregated packet responsively to the sequence numbers of the multiple decrypted packets forming a sequence of consecutive numbers; and provide the single aggregated packet to software running on a processor of the host device via the host device interface.

14. The device according to claim 13, wherein the packet processing circuitry is to:

check that the sequence numbers in security protocol headers and TCP headers of the decrypted packets form respective sequences of consecutive numbers; and aggregate the decrypted TCP packets into the single aggregated packet responsively to the sequence numbers in the security protocol headers and the TCP headers of the multiple decrypted packets forming respective sequences of consecutive numbers.

15. The device according to claim 13, wherein the packet processing circuitry is to:

generate metadata about the number of decrypted TCP packets comprised in the single aggregated packet; and provide the metadata to the software running on the processor of the host device.

16. A system, comprising:

a network device including:

a network interface to receive secured packets from a remote device over a packet data network, each of the secured packets being secured according to a security protocol and including a respective security protocol header and a Transmission Control Protocol (TCP) packet, which is encrypted according to the security protocol;

a host device interface to connect the network device to a host device; and packet processing circuitry to: decrypt each of the secured packets based on the respective security protocol header yielding multiple decrypted packets including decrypted TCP packets; aggregate the decrypted TCP packets into a single aggregated packet; and provide the single aggregated packet to software running on a processor of the host device via the host device interface; and the host device to run the software to:

receive the single aggregated packet; and decapsulate the given security protocol header from the aggregated packet.

17. The system according to claim 16, wherein the software is to update a replay protection map based on security protocol sequence numbers of the decrypted packets included in the single aggregated packet.

18. The system according to claim 17, wherein the software is to derive the security protocol sequence numbers from: metadata of the single aggregated packet; or header data of the single aggregated packet and a number of decrypted packets included in the single aggregated packet.

* * * * *